A. F. SMITH.
Corn-Planters.
No. 143,262.                          Patented September 30, 1873.
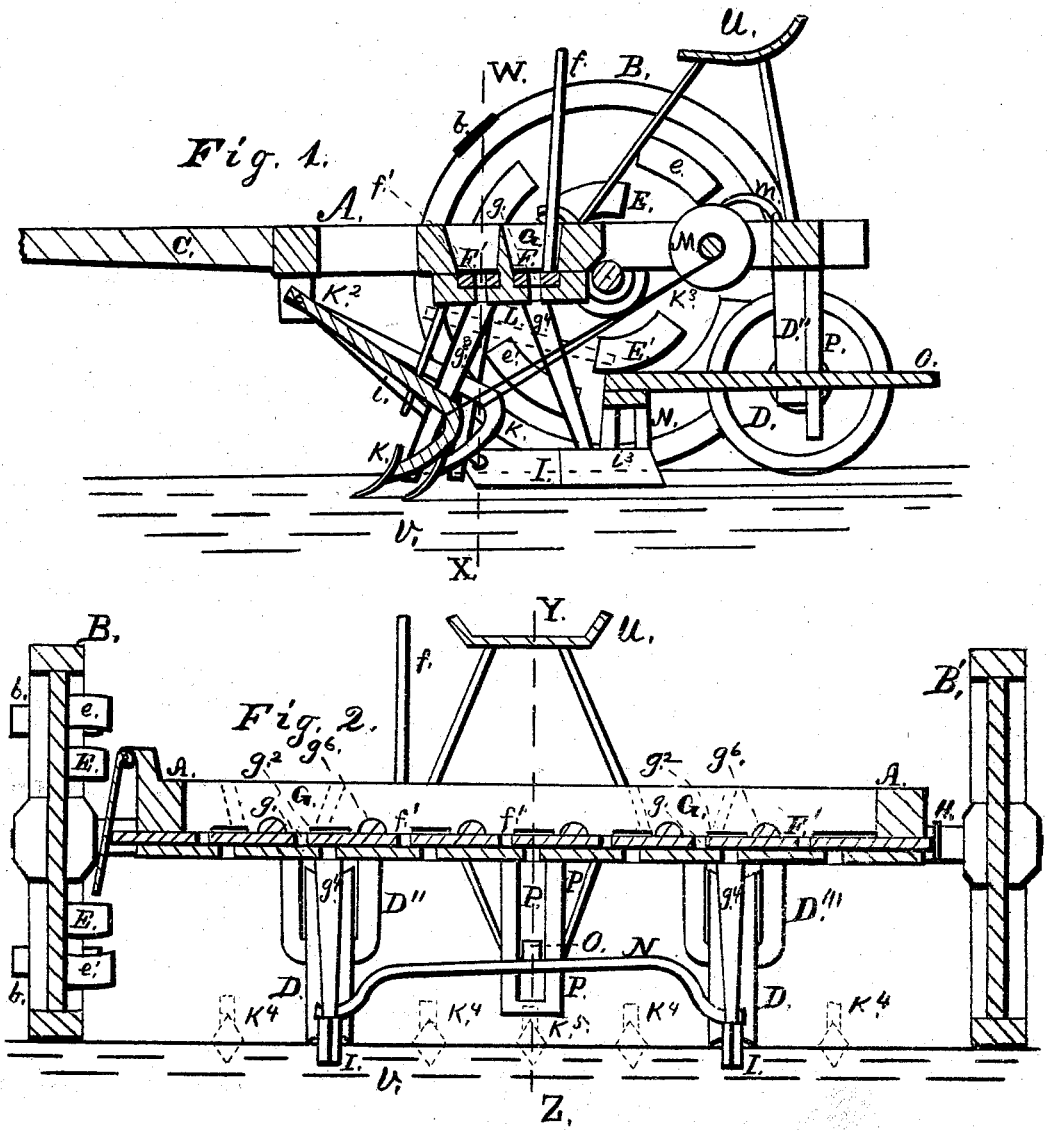

UNITED STATES PATENT OFFICE.

ALBERT F. SMITH, OF MONTROSE, IOWA.

IMPROVEMENT IN CORN-PLANTERS.

Specification forming part of Letters Patent No. 143,262, dated September 30, 1873; application filed May 27, 1873.

*To all whom it may concern:*

Be it known that I, ALBERT F. SMITH, of Montrose, county of Lee and State of Iowa, have invented certain new and useful Improvements in Corn-Planters; and I do hereby declare the following to be a full, clear, and exact description of the same, reference being had to the accompanying drawings and to the letters of reference marked thereon, in which—

Figure 1 is a vertical section of the machine in the line of draft. Fig. 2 is a like section of same across the line of draft.

The main frame A is hung on the main wheels B at the sides, and has a tongue, C, and corn-covering wheels D D behind. On the wheel B are fixed cams E E, arranged to operate against the end of the corn-slide F, which extends across the machine and through the corn-hopper G. This slide has a spring, H, which bears against its end to keep the other end against the cam, so as to press it back after it is forced out by the cam and released by it. When corn is put in the hopper G, and as the slide is pushed out, it falls into recesses or holes $g\ g$, which pass under the parts $g^2$, when it drops down through the tubes $g^4\ g^4$ behind the shoes I I, which open furrows for the corn to fall into. Then the wheels D D follow and cover it. On the side are small knobs $g^6\ g^6$ in the hoppers, arranged so that as the slide moves back and forth they stir or shake the grain up so that it may properly fall into the holes for dropping. The cams on the wheel are arranged so that the dropping will be about the right space apart for hills; and on the wheels are broad markers $b\ b$ arranged to make marks on the ground in line with the hills. The corn falls through tubes behind the cutter-shoes, which open furrows for the seed. The cutter-shoes I I are hung with connections $i$ pivoted forward, so as to have a free floating motion or capacity for rising and falling. The back ends of the shoes are connected by cross-bar N, which acts as an up-and-down evener to the shoes, allowing them to conform to the surface. From the bar N a bar, O, extends backward between guards P P, which allow it to be moved up or down to regulate the action of the shoes. A pin is used to hold the bar O in place at any height.

The several parts admit of various modifications in use.

Having thus fully described my invention, what I claim, and desire to secure by Letters Patent, is—

The hopper G, slide F, and tubes $g^4$, in combination with cutter-shoes I with cross-bar N, guards P, covering-wheels D, and driving-wheels B having markers $b$ and cams $e$, as shown and described.

ALBERT FRANKLIN SMITH.

Witnesses:
SAML. J. WALLACE,
M. REEVES, Jr.